Dec. 6, 1960 E. E. LA ROQUE 2,963,226
SELF PROPELLED SPRAYER
Filed Dec. 19, 1958 2 Sheets-Sheet 1
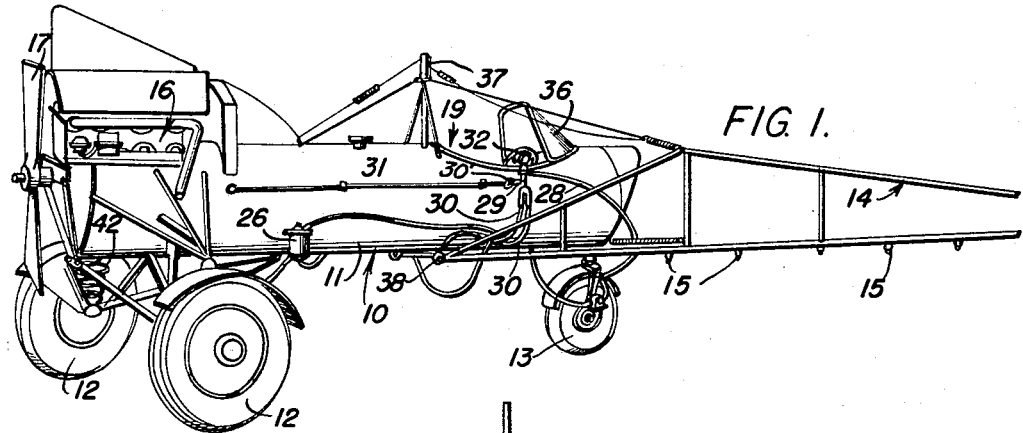
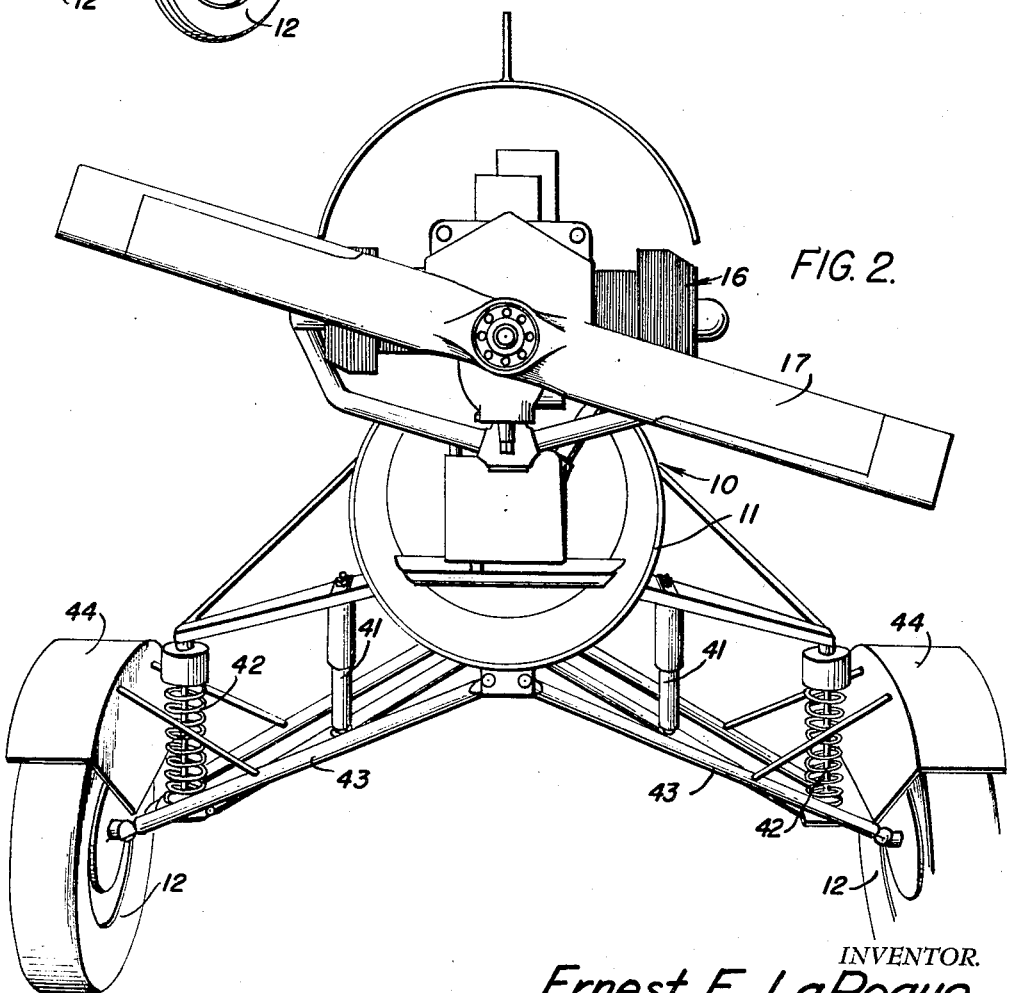
INVENTOR.
*Ernest E. LaRoque*
BY *Victor J. Evans & Co.*
ATTORNEYS Dec. 6, 1960
E. E. LA ROQUE
2,963,226
SELF PROPELLED SPRAYER
Filed Dec. 19, 1958
2 Sheets-Sheet 2
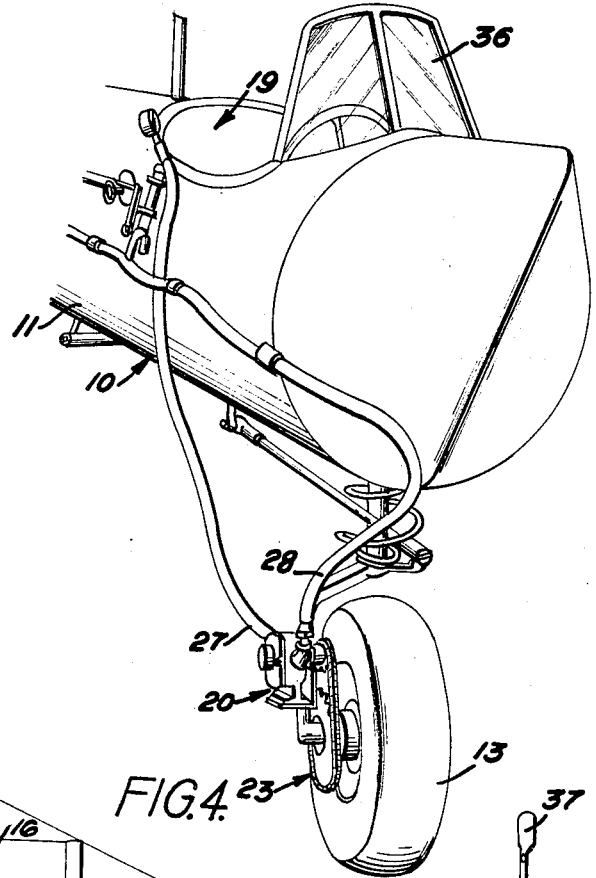
FIG.3.
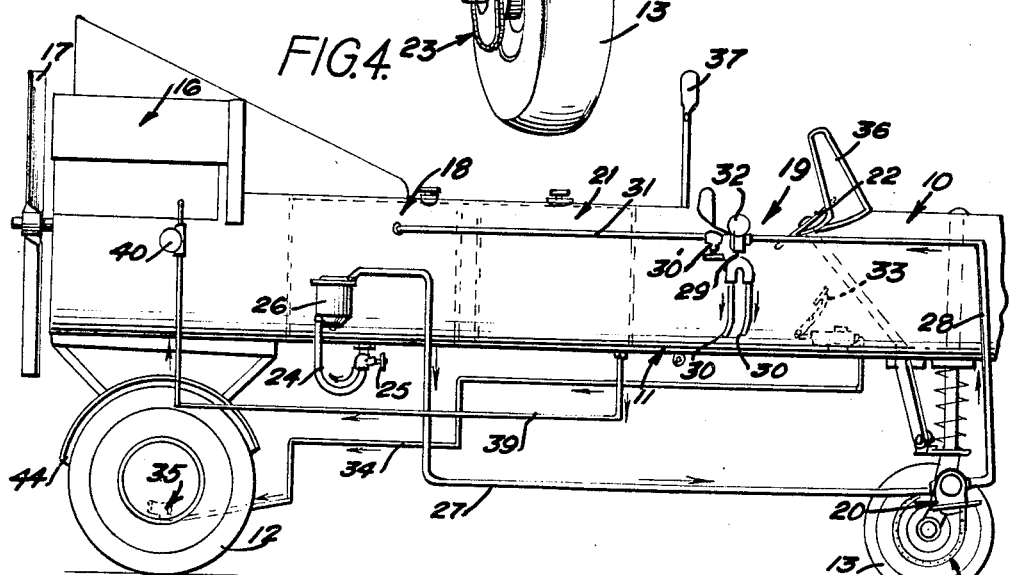
INVENTOR.
Ernest E. LaRoque
BY *Victor J. Evans & Co.*
ATTORNEYS

United States Patent Office 2,963,226
Patented Dec. 6, 1960

2,963,226

SELF PROPELLED SPRAYER

Ernest E. La Roque, Alexander, N. Dak.

Filed Dec. 19, 1958, Ser. No. 781,712

2 Claims. (Cl. 239—157)

This invention relates to a self-propelled sprayer.

The object of the invention is to provide a sprayer which is adapted to be driven along a farm or the like, whereby crops can be conveniently sprayed with a suitable chemical, or liquid or other substance.

Another object of the invention is to provide a self-propelled sprayer which includes a wheeled member that is adapted to support the operator, and wherein the sprayer is also provided with means for dispensing or discharging the chemical onto the crops or plants, the sprayer being provided with a power means for causing the device to travel along the ground in the desired manner.

A further object of the invention is to provide a self-propelled sprayer which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a perspective view of the self-propelled sprayer of the present invention.

Figure 2 is a front elevational view of the self-propelled sprayer.

Figure 3 is a fragmentary perspective view illustrating certain constructional details of the device.

Figure 4 is a side elevational view of the self-propelled sprayer, and showing certain of the parts diagrammatically.

Referring in detail to the drawings, the numeral 10 indicates the self-propelled sprayer of the present invention which is shown to comprise a horizontally disposed hollow elongated body member that is indicated generally by the numeral 11. The numeral 12 indicates rear wheels which are mounted below the body member 11 adjacent the rear end thereof, and there is further provided a single front wheel 13.

The sprayer 10 is provided with one or more booms 14 which are hingedly or pivotally connected to the body member 11 by any suitable means. The booms 14 are provided with discharge nozzles 15 whereby a liquid or spray can be discharged through the nozzles 15 onto the plants, crops or the like which are to be treated.

Mounted in the rear of the body member 11 is an engine 16 which serves to rotate a propeller 17. The numeral 18 indicates a liquid supply tank which is mounted in the body member 11, and the numeral 19 indicates a cockpit for supporting the operator of the sprayer. The numeral 20 indicates a pump of conventional construction which is operated by rotation of the front wheel 13 whereby the chemicals in the tank 18 can be conveyed through suitable conduits to the booms 14, and this chemical can then spray out through the nozzles 15. Instead of discharging chemicals, it is to be understood that water can be sprayed outward through the nozzles 15 or any other medium or substance can be sprayed. The body member 11 is further provided with a fuel tank or reservoir 21 whereby fuel can be supplied through suitable conduits to the engine 16.

The numeral 22 indicates a steering control wheel whereby the device can be readily guided or controlled as desired. The numeral 23 indicates a chain and sprocket mechanism or gear mechanism which is used for causing the pump 20 to be actuated when the wheel 13 rotates.

The material in the tank 18 may be a suitable liquid spray or insecticide, and suitable conduits or hoses are provided for the passage therethrough of this liquid. Thus, a conduit 24 is connected to the bottom of the tank 18, and a valve 25 is arranged in the conduit 24, the conduit 24 leading to a filter 26. A conduit 27 leads from the filter 26 to the pump 20, and a conduit 28 leads from the pump 20 to a fitting 29. A pair of branch lines or conduits 30 extend from the fitting 29 to each of the booms 14 whereby the liquid can be properly conveyed to the booms and then through the discharge nozzles 15 onto the plants or area being sprayed. A return line 31 leads to the tank 18, and a valve 30' is associated with the line 31, and as shown in Figure 4 there is also provided a gauge 32.

The numeral 33 indicates a brake pedal which is arranged convenient to the person sitting in the cockpit 19, and the brake pedal 33 is adapted to actuate vehicle brakes 35 through the medium of conduits 34, and the brakes 35 are connected to the wheels such as the rear wheels 12.

The numeral 37 indicates an upstanding support member which helps support the swinging booms 14, and the booms 14 may be hingedly or pivotally connected to the sides or other portions of the body member 11 by means of hinge joints 38. This construction permits the booms 14 to be moved to the most advantageous position.

It will be seen that according to the present invention there has been provided a pusher type machine wherein the seat or cockpit 19 is arranged in the front although in certain instances the cockpit may be arranged at the rear. Hydraulic lifts may be provided for moving the booms. By providing the device in the form of a pusher type machine, the operator of the machine will have better vision.

The numeral 39 indicates a line or conduit which can be used for supplying fuel from the fuel tank 21 to the engine 16, and a suitable fuel pump 40 is provided for pumping the fuel to the engine. The machine is further provided with shock absorbers 41 as well as spring mountings 42, and the wheels may be connected in place by suitable braces or struts such as the struts 43. The wheels 12 may be provided with fenders 44, Figure 2.

From the foregoing, it is apparent that there has been provided a self-propelled sprayer which can be used for spraying any suitable type of liquid, insecticide or the like, onto plants, crops or the like. According to the present invention the driver is adapted to seat in the cockpit 19, and the windshield 36 provides clear vision for the driver and also helps protect the driver from being subjected to strong winds or the like. The engine 16 is adapted to be actuated so as to rotate the propeller 17, and this rotation of the propeller 17 will serve to propel or move the sprayer 10 along the area being worked. At the same time, the valves can be adjusted so that with the front wheel 13 turning, the chain and sprocket mechanism 23 will operate the pump 20 which will cause the insecticide or other liquid in the tank 18 to pass through the conduit 24, then through the filter 26, then through the conduit 27, and this liquid will then pass through the conduit 28 and then through the conduit 30 and then into the booms 14. The booms 14 may be of hollow tubular formation so that the insecticide can pass to the discharge nozzles 15 and from the nozzles 15 the material can be sprayed onto the plants being treated.

The booms 14 are hingedly connected to the sprayer 10 so that these booms 14 can be moved to different positions whereby the spray can be directed to the desired location. The member 11 is also provided with a fuel tank 21 so that this fuel can be used for operating the engine 16 which rotates the propeller 17.

The parts can be made of any suitable material and in different shapes or sizes.

Thus, it will be seen that there has been provided a self-propelled sprayer which will enable a person to conveniently spray crops during the growing season, and wherein the device can be converted to a snow sled by addition of skis.

The member 11 is in the nature of a tubular steel device which has a cockpit 19 for the driver adjacent the front end, while at the other end there is provided the propeller 17 and motor 16 for either pushing or pulling the machine. The tank 18 is mounted inside the body 11 and the body is mounted on three wheels, two in the rear and one in the front. Two booms, one on either side are adapted to be provided, and these booms can be raised and lowered by any suitable means. The pump 20 which is connected to the wheel 13 provides the pressure to force the liquid into the booms and out through the nozzles 15.

The machine is driven by an air cooled or water cooled motor 16 which drives a propeller 17 to pull or push the machine at the desired speed through fields or on the road, and it will spray an area of very much width and it also can be used for spraying trees. The wind from the propeller 17 stirs up the weeds driving the spray into them.

Some of the advantages of the present invention are as follows. The device is light enough so that it will not leave deep tracks in the field, and the propeller 17 has a tendency to drive the spray into the weeds and it can cover a very large area and it will get close to the ground. It will use a minimum amount of fluid and is inexpensive to build and safe to operate and the parts are arranged and constructed so that fumes of liquid will be kept away from the driver.

Minor changes in shape, size and rearrangement of details coming within the field of invention claimed may be resorted to in actual practice, if desired.

I claim:

1. In a self-propelled sprayer, a horizontally disposed hollow elongated body member, rear wheels arranged contiguous to the rear of the body member and operatably connected thereto, a front wheel mounted below the front of the body member, booms pivotally connected to the body member, discharge nozzles carried by said booms, an engine mounted in the rear of the body member, a propeller operated by said engine, a cockpit in the front of the body member, a liquid supply tank in the body member, a pump operated by said front wheel, and conduits connecting said pump to said liquid supply tank and to said booms.

2. A self-propelled sprayer comprising a horizontally disposed hollow elongated body member, rear wheels mounted below the body member and arranged contiguous to the rear of the body member and operatively connected thereto, a single front wheel mounted below the front of the body member, booms pivotally connected to the body member, discharge nozzles carried by the said booms whereby a liquid or spray can be discharged through the nozzles onto the plants, crops or the like which are to be treated, an engine mounted in the rear of the body member, a propeller operated by said engine, a cockpit in the front of the body member for supporting the operator of the sprayer, a liquid supply tank in the body member, a pump operated by said front wheel, conduits connecting said pump to said liquid supply tank and to said booms, a fuel supply reservoir in said body member, a mechanism for causing the pump to be actuated when the front wheel rotates, and said sprayer being a pusher type machine so that the operator of the machine has best vision.

References Cited in the file of this patent

UNITED STATES PATENTS

| 2,504,580 | Pierson | Apr. 18, 1950 |

FOREIGN PATENTS

| 177,594 | Austria | Feb. 10, 1954 |
| 564,771 | Great Britain | Oct. 12, 1944 |